United States Patent
Park et al.

(10) Patent No.: US 10,200,994 B2
(45) Date of Patent: Feb. 5, 2019

(54) NON-EQUAL BIT ALLOCATION FOR COEXISTENCE WITH SCALED NUMEROLOGY SYSTEMS

(71) Applicant: QUALCOMM Incorporated, San Diego, CA (US)

(72) Inventors: Seyong Park, San Diego, CA (US); Jing Jiang, San Diego, CA (US); Hao Xu, San Diego, CA (US); Lu Zhao, Spardorf (DE); Alexandros Manolakos, San Diego, CA (US); June Namgoong, San Diego, CA (US); Wei Zeng, San Diego, CA (US); Huang Lou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 83 days.

(21) Appl. No.: 15/591,374

(22) Filed: May 10, 2017

(65) Prior Publication Data
US 2017/0339697 A1    Nov. 23, 2017

Related U.S. Application Data

(60) Provisional application No. 62/339,647, filed on May 20, 2016.

(51) Int. Cl.
*H04W 72/04* (2009.01)
*H04L 5/00* (2006.01)
(Continued)

(52) U.S. Cl.
CPC ....... *H04W 72/0453* (2013.01); *H04L 5/0007* (2013.01); *H04L 5/0044* (2013.01);
(Continued)

(58) Field of Classification Search
None
See application file for complete search history.

(56) References Cited

U.S. PATENT DOCUMENTS

| 2011/0103406 A1 | 5/2011 | Cai et al. | |
| 2011/0317647 A1* | 12/2011 | Cho | H04L 5/0007 370/329 |

(Continued)

FOREIGN PATENT DOCUMENTS

| EP | 2 999 251 A1 | 3/2016 |
| WO | WO-2017/005331 A1 | 1/2017 |

OTHER PUBLICATIONS

International Search Report and Written Opinion—PCT/US2017/032188—ISA/EPO—dated Nov. 20, 2017. 14 pages.
(Continued)

*Primary Examiner* — Kouroush Mohebbi
(74) *Attorney, Agent, or Firm* — Arent Fox, LLP

(57) ABSTRACT

Aspects of the present disclosure describe a guard band signal for communication on a guard band between a first frequency band utilized by a first radio access technology having a first sub-carrier spacing and a second frequency band utilized by a second radio access technology having a second sub-carrier spacing that is a multiple of the first sub-carrier spacing. The guard band signal includes a symbol that is repeated a number of times equal to the multiple. The guard band signal may be generated and transmitted by a transmitting device. The guard band signal may be received and decoded by a receiving device. The guard band signal is interpretable according to a first numerology of the first radio access technology and according to a second numerology of the second radio access technology.

30 Claims, 12 Drawing Sheets

(51) Int. Cl.
*H04L 27/26* (2006.01)
*H04L 25/03* (2006.01)
*H04W 16/14* (2009.01)

(52) U.S. Cl.
CPC .... *H04L 27/2602* (2013.01); *H04L 25/03821* (2013.01); *H04W 16/14* (2013.01)

(56) References Cited

U.S. PATENT DOCUMENTS

2013/0195002 A1   8/2013   Walker et al.
2014/0194155 A1   7/2014   Ko et al.
2016/0269135 A1   9/2016   Jiang et al.
2016/0294498 A1*  10/2016  Ma ...................... H04J 11/0063

OTHER PUBLICATIONS

Nokia et al., "Flexible Numerology for 5G New Radio", 3GPP DRAFT; R1-162894, 3rd Generation Partnership Project (3GPP), Mobile Competence Centre, 650, Route Des Lucioles, F-06921 Sophia-Antipolis Cedex, France, vol. RAN WG1, No. Busan, Korea; Apr. 1, 2016, XP051079735, Retrieved from the Internet: URL:http://www.3gpp.org/ftp/tsg_ran/WG1_RL1/TSGR1_84b/Docs/ [retrieved on Apr. 1, 2016], 5 pages.

Ratasuk R., et al., "NB-IoT System for M2M Communication" IEEE Wireless Communications and Networking Conference Workshops (WCNCW), IEEE, Apr. 3, 2016, pp. 428-432, XP032953515, DOI: 10.1109/WCNCW.2016.7552737 [retrieved on Aug. 25, 2016].

* cited by examiner

NON-EQUAL BIT ALLOCATION FOR COEXISTENCE WITH SCALED NUMEROLOGY SYSTEMS

CLAIM OF PRIORITY UNDER 35 U.S.C. § 119

This application claims priority to U.S. Provisional Application No. 62/339,647, titled "NON-EQUAL BIT ALLOCATION FOR COEXISTENCE WITH SCALED NUMEROLOGY SYSTEMS," filed May 20, 2016, which is assigned to the assignee hereof, and incorporated herein by reference in its entirety.

BACKGROUND

Aspects of the present disclosure relate generally to wireless communication systems, and more particularly, to wireless communication systems that implement techniques for a common or unified synchronization signal.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

A wireless multiple-access communication system may use frequency division multiplexing (FDM) to multiplex different users within a frequency band. For example OFDMA uses orthogonal sub-carriers or tones to provide defined resource elements. A numerology for an OFDMA system defines the sub-carrier spacing, symbol length, and cyclic prefix ratio. Different OFDMA systems may use different numerologies. When different OFDMA systems are present, the frequency bands used by the systems are generally separated by a guard band with no transmissions.

The 5G mobile standard is currently being formulated and calls for higher data transfer speeds, greater numbers of connections, and better coverage, among other improvements. The 5G standard, according to the Next Generation Mobile Networks Alliance, is expected to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Accordingly, there is a need for development of better transmission/processing techniques for wireless data transmission to meet different requirements of different applications/users at the same time.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure describe a guard band signal for communication on a guard band between a first frequency band utilized by a first radio access technology having a first sub-carrier spacing and a second frequency band utilized by a second radio access technology having a second sub-carrier spacing that is a multiple of the first sub-carrier spacing. The guard band signal includes a symbol that is repeated a number of times equal to the multiple. The guard band signal may be generated and transmitted by a transmitting device. The guard band signal may be received and decoded by a receiving device. The guard band signal is interpretable according to a first numerology of the first radio access technology and according to a second numerology of the second radio access technology.

In an aspect, the disclosure provides a method of transmission on a guard band in wireless communications. The method includes generating, a guard band signal for transmission on a guard band between a first frequency band utilized by a first radio access technology having a first sub-carrier spacing and a second frequency band utilized by a second radio access technology having a second sub-carrier spacing that is a multiple of the first sub-carrier spacing. The guard band signal includes a symbol that is repeated a number of times equal to the multiple. The method also includes transmitting the guard band signal on the guard band.

In another aspect, the disclosure provides an apparatus for transmission on a guard band in wireless communications. The apparatus may include a transmitter, a memory configured to store instructions, and a processor coupled to the transmitter and the memory. The processor may be configured to generate, a guard band signal for transmission on a guard band between a first frequency band utilized by a first radio access technology having a first sub-carrier spacing and a second frequency band utilized by a second radio access technology having a second sub-carrier spacing that is a multiple of the first sub-carrier spacing. The guard band signal may include a symbol that is repeated a number of times equal to the multiple. The processor may be configured to transmit the guard band signal on the guard band via the transmitter.

In another aspect, the disclosure provides another apparatus for transmission on a guard band in wireless communications. The apparatus may include means for generating a guard band signal for transmission on a guard band between a first frequency band utilized by a first radio access technology having a first sub-carrier spacing and a second frequency band utilized by a second radio access technology having a second sub-carrier spacing that is a multiple of the first sub-carrier spacing. The guard band signal may include a symbol that is repeated a number of times equal to the multiple. The apparatus may include means for transmitting the guard band signal on the guard band.

In another aspect, the disclosure provides a computer-readable medium for transmission on a guard band. The computer-readable medium may include instructions to generate a guard band signal for transmission on a guard band between a first frequency band utilized by a first radio access technology having a first sub-carrier spacing and a second frequency band utilized by a second radio access technology having a second sub-carrier spacing that is a multiple of the first sub-carrier spacing. The guard band signal may include a symbol that is repeated a number of times equal to the multiple. The compute-readable medium may also include instructions to transmit the guard band signal on the guard band.

In another aspect, the disclosure provides a method of receiving a guard band signal in wireless communications. The method includes receiving, a guard band signal on a guard band between a first frequency band utilized by a first radio access technology having a first sub-carrier spacing and a second frequency band utilized by a second radio access technology having a second sub-carrier spacing that is a multiple of the first sub-carrier spacing. The guard band signal includes a symbol that is repeated a number of times equal to the multiple. The method also includes decoding the guard band signal based on the multiple and the first sub-carrier spacing or the second sub-carrier spacing.

In another aspect, the disclosure provides an apparatus for receiving a guard band signal in wireless communications. The apparatus may include a receiver, a memory configured to store instructions, and a processor coupled to the transmitter and the memory. The processor may be configured to receive, via the receiver, a guard band signal on a guard band between a first frequency band utilized by a first radio access technology having a first sub-carrier spacing and a second frequency band utilized by a second radio access technology having a second sub-carrier spacing that is a multiple of the first sub-carrier spacing. The guard band signal may include a symbol that is repeated a number of times equal to the multiple. The processor may be configured to decode the guard band signal based on the multiple and the first sub-carrier spacing or the second sub-carrier spacing.

In another aspect, the disclosure provides another apparatus for receiving a guard band signal in wireless communications. The apparatus may include means for receiving, a guard band signal on a guard band between a first frequency band utilized by a first radio access technology having a first sub-carrier spacing and a second frequency band utilized by a second radio access technology having a second sub-carrier spacing that is a multiple of the first sub-carrier spacing. The guard band signal may include a symbol that is repeated a number of times equal to the multiple. The apparatus may also include means for decoding the guard band signal based on the multiple and the first sub-carrier spacing or the second sub-carrier spacing.

In another aspect, the disclosure provides a computer-readable medium for receiving a guard band signal in wireless communications. The computer-readable medium may include instructions to receive a guard band signal on a guard band between a first frequency band utilized by a first radio access technology having a first sub-carrier spacing and a second frequency band utilized by a second radio access technology having a second sub-carrier spacing that is a multiple of the first sub-carrier spacing. The guard band signal may include a symbol that is repeated a number of times equal to the multiple. The computer-readable medium may include instructions to decode the guard band signal based on the multiple and the first sub-carrier spacing or the second sub-carrier spacing.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
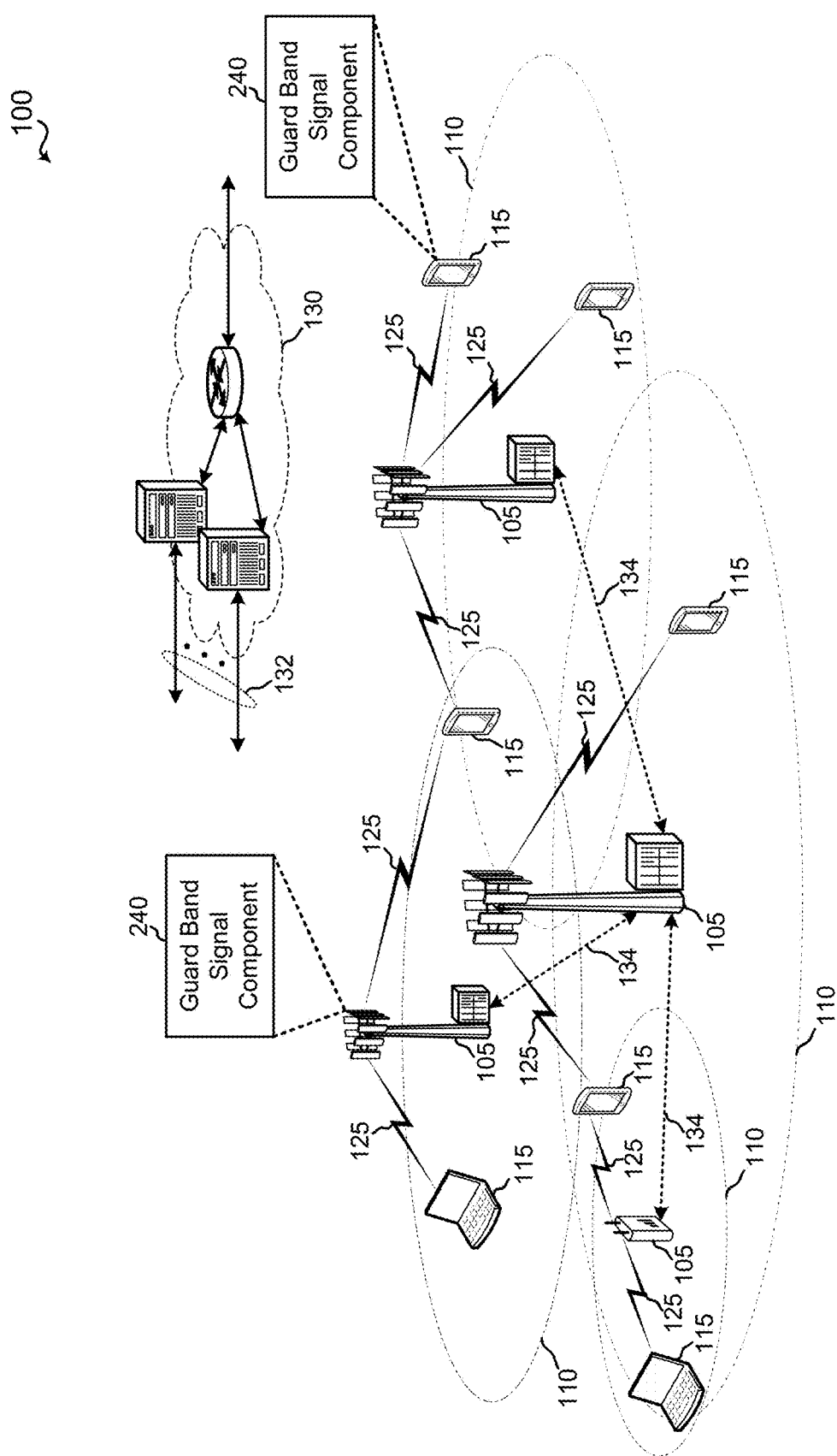
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to using a guard band between a first frequency band utilized by a first radio access technology (RAT) using a first sub-carrier spacing and a second frequency band utilized by a second RAT using a second sub-carrier spacing that is a multiple of the first sub-carrier spacing. Generally, OFDMA uses orthogonal sub-carriers to prevent inter carrier interference. The guard band separates different frequency bands where the applicable RATs use different sub-carrier spacing that would result in non-orthogonal sub-carriers. The guard band typically includes no transmissions and may be viewed as unutilized spectrum.

According to aspects of the present disclosure, a guard band signal may be transmitted and received on the guard band to utilize the previously unutilized spectrum. In the case where a second sub-carrier spacing is a multiple of the first sub-carrier spacing, the guard band signal can be structured so that it minimizes inter carrier interference with both the first frequency band and the second frequency band. For example, by repeating an OFDMA symbol and managing a cyclic prefix (CP) for each symbol, the guard band signal may comply with the numerology of both the first RAT and the second RAT. The waveforms utilized may include any OFDM-based waveform with CP, such as CP-OFDM and discrete Fourier transform (DFT) spread OFDM (DFT-s-OFDM). The described features will be presented in more detail below with reference to FIGS. 1-16.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 illustrates an example of a wireless communication system 100 in accordance with various aspects of the present disclosure. The wireless communication system 100 may include one or more base stations 105, one or more UEs 115, and a core network 130. The core network 130 may provide user authentication, access authorization, tracking, internet protocol (IP) connectivity, and other access, routing, or mobility functions. The base stations 105 may interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a network entity, a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may be or include a Long Term Evolution (LTE) or LTE-Advanced (LTE-A) network. The wireless communication system 100 may also be a next generation network, such as a 5G wireless communication network. For example, the communication system 100 may be a narrow-band Internet of Things (NB-IoT) network, a 5G new radio (NR) network, or use a combination of RATs. In LTE/LTE-A networks, the term evolved node B (eNB) may be generally used to describe the base stations 105, while the term UE may be generally used to describe the UEs 115. The wireless communication system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 115 with service subscriptions with the network provider.

A small cell may include a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A MAC layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an entertainment device, a vehicular component, or the like. A UE may be able to communicate with various types of base stations and network equipment including macro eNBs, small cell eNBs, relay base stations, and the like.

The wireless communication links 125 shown in wireless communication system 100 may carry UL transmissions from a UE 115 to a base station 105, or downlink (DL) transmissions, from a base station 105 to a UE 115. The downlink transmissions may also be called forward link transmissions while the uplink transmissions may also be called reverse link transmissions. Each wireless communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In aspects of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In aspects of the wireless communication system 100, the wireless communication system 100 may utilize guard band signals at the PHY layer. That is, the guard band signals described herein may be utilized to transmit higher layer data.

In aspects of the wireless communication system 100, a base station 105 may include a guard band signal component 240 (see e.g., FIG. 2) configured to transmit guard band signals to one or more UEs 115 and/or receive guard band signals from one or more UEs. Similarly, in an aspect, a UE 115 may include a guard band signal component 240 configured to transmit guard band signals to a base station 105 and/or receive a guard band signal from a base station 105.

The guard band signals may be utilized when the base station 105 and UE 115 are communicating using one of the neighboring frequency bands, or may be utilized independently of the neighboring frequency bands.

Figure 2:
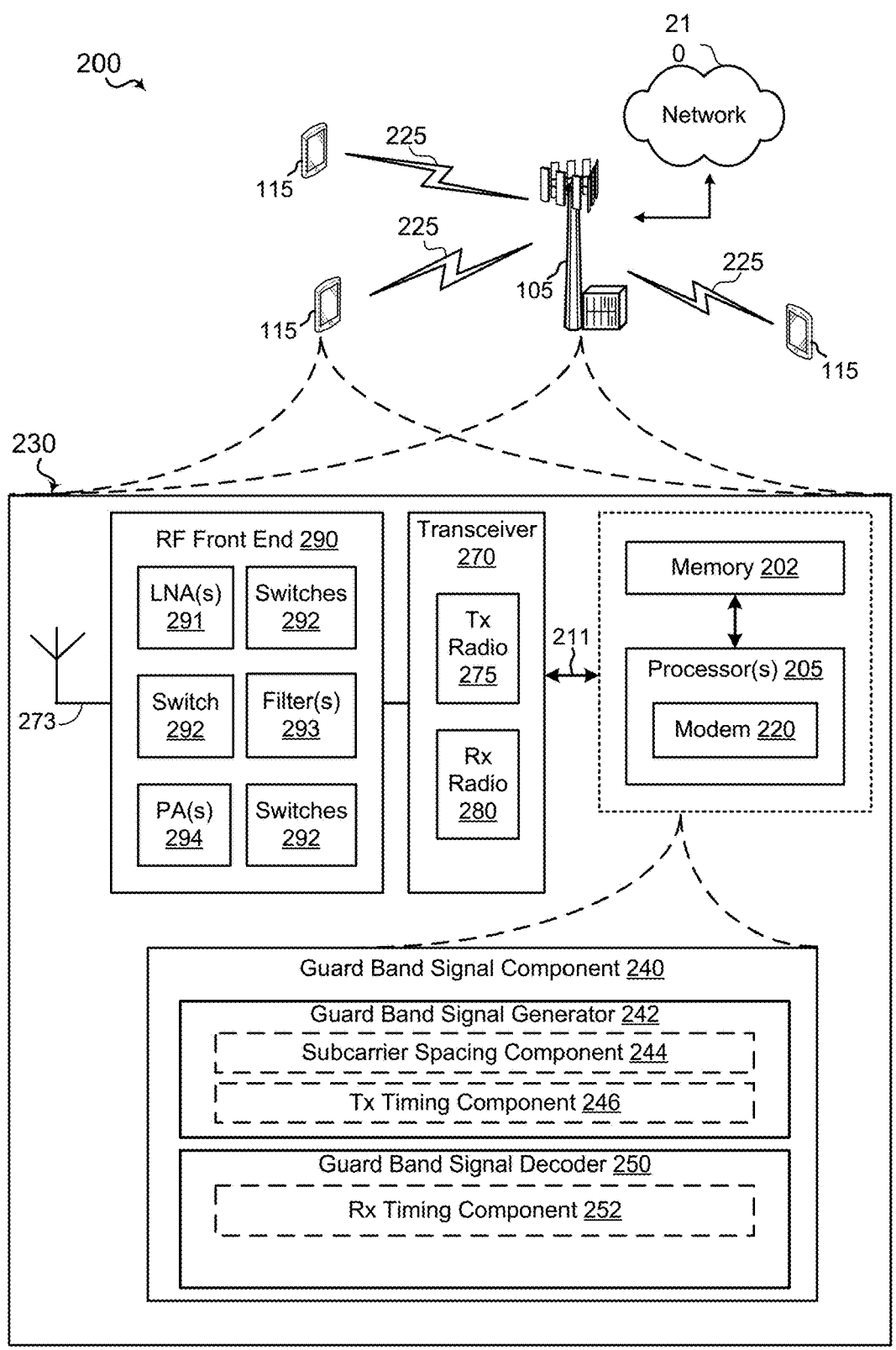
FIG. 2 is a block diagram illustrating an example of a device, in accordance with various aspects of the present disclosure.

Referring to FIG. 2, a block diagram 200 is shown that includes a portion of a wireless communications system having multiple UEs 115 in communication with a base station 105 via communication links 125, where the base station 105 is also connected to a network 210. The UEs 115 may be examples of the UEs described in the present disclosure that are configured to receive and process guard band signals. Moreover the base station 105 may be an example of the base stations described in the present disclosure that are configured to generate and transmit guard band signals. Either the base station 105 or the UE 115 may be a device 230 including a guard band signal component 240.

In an aspect, the device 230 in FIG. 2 may include one or more processors 205 and/or memory 202 that may operate in combination with guard band signal component 240 to perform the functions, methodologies (e.g., method 300 of FIG. 3 and method 400 of FIG. 4), or methods presented in the present disclosure. In accordance with the present disclosure, the guard band signal component 240 may include a guard band signal generator 242 having an optional subcarrier spacing component 244, an optional Tx timing component 246, and a guard band signal decoder 250, which may optionally include an optional Rx timing component 252.

The one or more processors 205 may include a modem 220 that uses one or more modem processors. The various functions related to the guard band signal component 240 may be included in modem 220 and/or processor 205 and, in an aspect, can be executed by a single processor, while in other aspects, different ones of the functions may be executed by a combination of two or more different processors. For example, in an aspect, the one or more processors 205 may include any one or any combination of a modem processor, or a baseband processor, or a digital signal processor, or a transmit processor, or a transceiver processor associated with transceiver 270, or a system-on-chip (SoC). In particular, the one or more processors 205 may execute functions and components included in the guard band signal component 240.

In some examples, the guard band signal component 240 and each of the sub-components may comprise hardware, firmware, and/or software and may be configured to execute code or perform instructions stored in a memory (e.g., a computer-readable storage medium, such as memory 202 discussed below). Moreover, in an aspect, the base station 105 in FIG. 2 may include a radio frequency (RF) front end 290 and transceiver 270 for receiving and transmitting radio transmissions to, for example, UEs 115. The transceiver 270 may coordinate with the modem 220 to transmit messages generated by the guard band signal component 240 (e.g., guard band signals 225 in FIG. 2) to the UEs. RF front end 290 may be connected to one or more antennas 273 and can include one or more switches 292, one or more amplifiers (e.g., power amplifiers (PAs) 294 and/or low-noise amplifiers 291), and one or more filters 293 for transmitting and receiving RF signals on uplink channels and downlink channels. In an aspect, the components of the RF front end 290 can connect with transceiver 270. The transceiver 270 may connect to one or more of modem 220 and processors 205.

The transceiver 270 may be configured to transmit (e.g., via transmitter (Tx) radio 275) and receive (e.g., via receiver (Rx) radio 280) wireless signals through antennas 273 via the RF front end 290. In an aspect, the transceiver 270 may be tuned to operate at specified frequencies such that the base station 105 can communicate with, for example, UEs 115. In an aspect, for example, the modem 220 can configure the transceiver 270 to operate at a specified frequency and power level based on the configuration of the base station 105 and communication protocol used by the modem 220.

The base station 105 in FIG. 2 may further include a memory 202, such as for storing data used herein and/or local versions of applications or guard band signal component 240 and/or one or more of its subcomponents being executed by processor 205. Memory 202 can include any type of computer-readable medium usable by a computer or processor 205, such as random access memory (RAM), read only memory (ROM), tapes, magnetic discs, optical discs, volatile memory, non-volatile memory, and any combination thereof. In an aspect, for example, memory 202 may be a computer-readable storage medium that stores one or more computer-executable codes defining guard band signal component 240 and/or one or more of its subcomponents. Additionally or alternatively, the base station 105 may include a bus 211 for coupling one or more of the RF front end 290, the transceiver 274, the memory 202, or the processor 205, and to exchange signaling information between each of the components and/or subcomponents of the base station 105.

Figure 11:
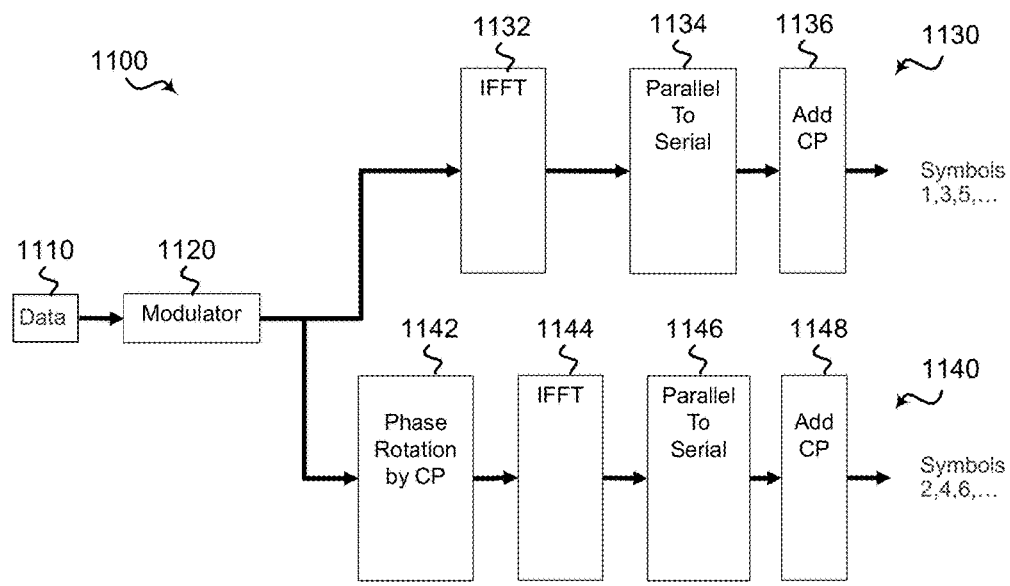
FIG. 11 illustrates an example of transmission processing for a guard band signal, in accordance with various aspects of the present disclosure.
Figure 12:
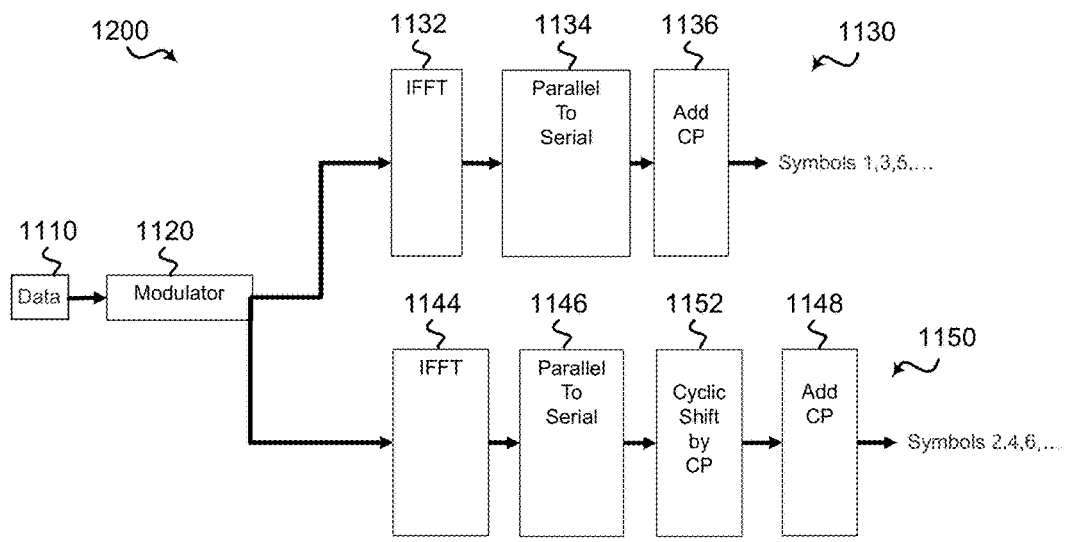
FIG. 12 illustrates another example of transmission processing for a guard band signal, in accordance with various aspects of the present disclosure.
Figure 14:
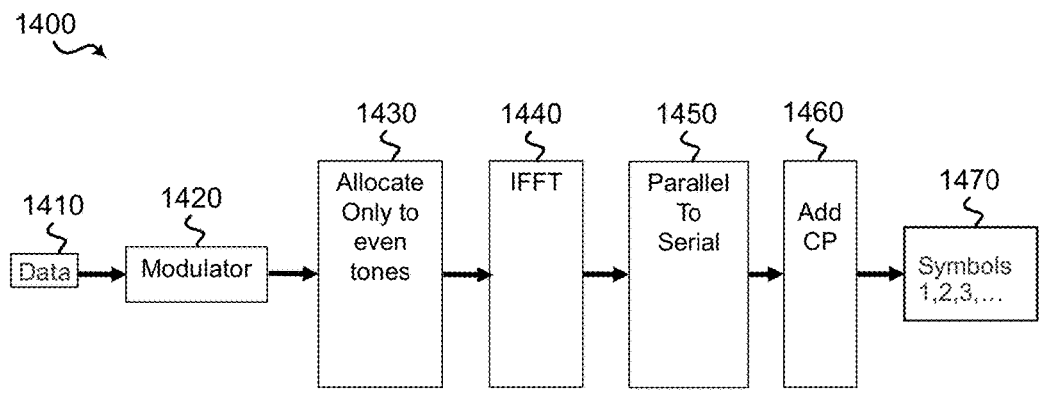
FIG. 14 illustrates an example of alternative transmission processing for a guard band signal, in accordance with various aspects of the present disclosure.

The guard band signal generator 242 of the guard band signal component 240 may be configured to generate guard band signals that minimize inter carrier interference to neighboring frequency bands. Generally, a guard band signal may be transmitted using a sub-carrier spacing that is a multiple of the sub-carrier spacing used on one neighboring frequency band and the same as the sub-carrier spacing used on the other neighboring frequency band. Further, the guard band signal may repeat symbols in the time domain. Additionally, cyclic prefixes may be added to the guard band signal such that the guard band signal matches the structure of both the first RAT and the second RAT. Accordingly, the guard band signal may be interpreted according to a numerology of the first RAT or according to numerology of the second RAT. FIGS. 11, 12, and 14 illustrate example implementations of processing performed by the guard band signal generator 242 and are described in further detail below.

The guard band signal generator 242 may optionally include a subcarrier spacing component 244 for determining scalable subcarrier spacing. For example, the subcarrier spacing component 244 may determine whether scalable subcarrier spacing is utilized on neighboring frequency bands. For example in NB-IoT, sub-carrier spacing of 15 kHz may be used, while in 5G NR sub-carrier spacing of 30 kHz may be used. If the guard band separates a NB-IoT frequency band from a 5G NR frequency band, the subcarrier spacing component 244 may determine that scalable sub-carrier spacing is used because the 30 kHz sub-carrier spacing is a multiple of the 15 kHz sub-carrier spacing. As another example, other networks may support more than one subcarrier spacing (e.g., 17.5 kHz, 35 kHz, or 140 kHz). The subcarrier spacing component 244 may determine which sub-carrier spacing is in use one each neighboring frequency band and determine whether the sub-carrier spacings are scalable (e.g., multiples).

The guard band signal generator 242 may optionally include a Tx timing component 246 for detecting a timing offset between the first radio access technology and the second radio access technology. The Tx timing component 246 may also synchronize the guard band signal with one of the first radio access technology or the second radio access technology.

Figure 13:
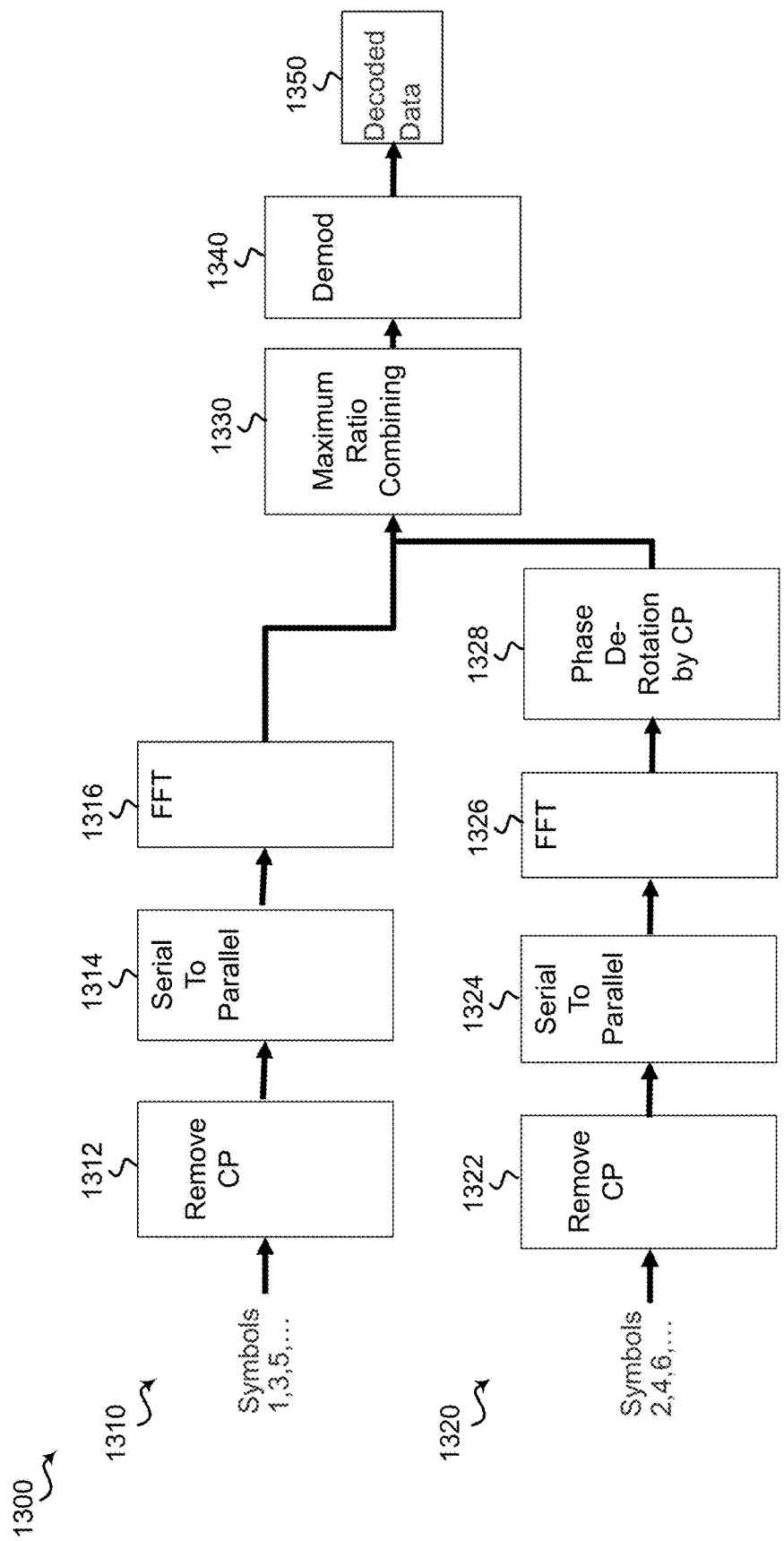
FIG. 13 illustrates an example of receive processing for a guard band signal, in accordance with various aspects of the present disclosure.
Figure 15:
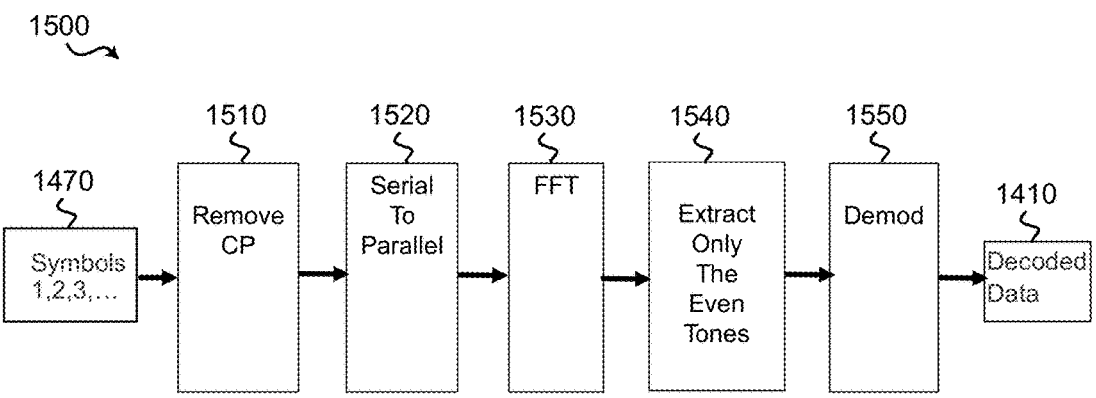
FIG. 15 illustrates an example of alternative receive processing for a guard band signal, in accordance with various aspects of the present disclosure.

The guard band signal decoder 250 may be configured to receive a guard band signal transmitted by another device 230. The guard band signal decoder 250 may process the guard band signal to extract encoded information and pass the information to higher layers. The guard band signal decoder 250 may utilize properties of the guard band signal to correctly decode the encoded information. FIGS. 13 and 15 illustrate example implementations of processing performed by the guard band signal decoder 250 and are described in further detail below.

The guard band signal decoder 250 may optionally include an Rx timing component 252 for detecting a timing offset between the first radio access technology and the second radio access technology. The guard band signal may be synchronized with one of the first radio access technology or the second radio access technology. For example, the guard band signal decoder 250 may compare configuration information and/or synchronization channels to determine the timing offset between the first radio access technology and the second radio access technology. The Rx timing component 252 may also select a FFT window based on the timing offset that avoids interference from the other of the first radio access technology or the second radio access technology. For example, the Rx timing component 252 may select an FFT window based on the timing offset that includes a portion of a symbol and a portion of a cyclic prefix of the other of the first radio access technology or the second radio access technology, as described in further detail below with respect to FIG. 16.

In an aspect, the processor(s) 205 may correspond to one or more of the processors described in connection with the base station or UE in FIG. 17. Similarly, the memory 202 may correspond to the memory described in connection with the base station or the UE in FIG. 17.

Figure 3:
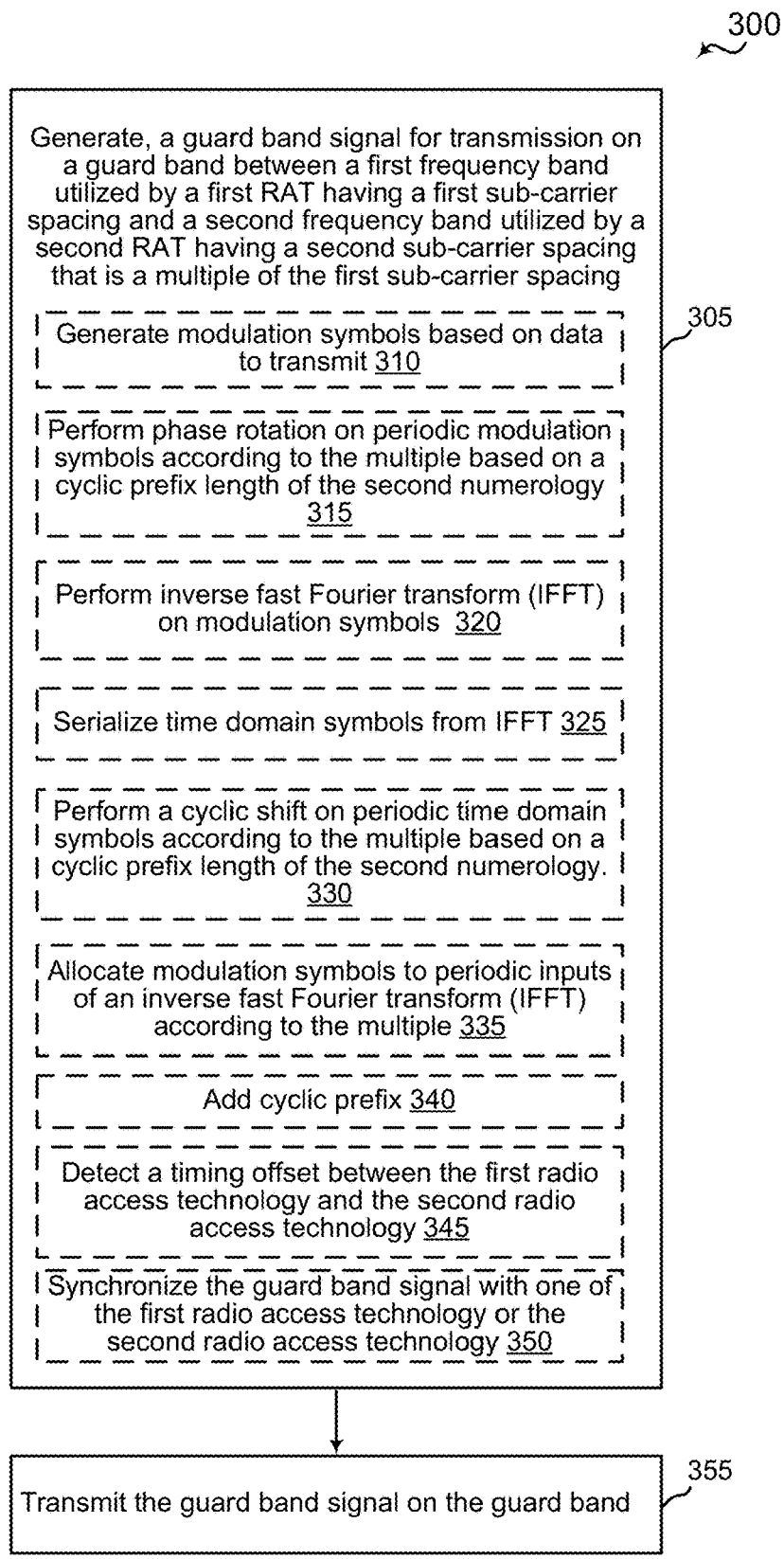
FIG. 3 is a flow chart illustrating an example method for broadcasting unified synchronization signals, in accordance with various aspects of the present disclosure.
Figure 4:
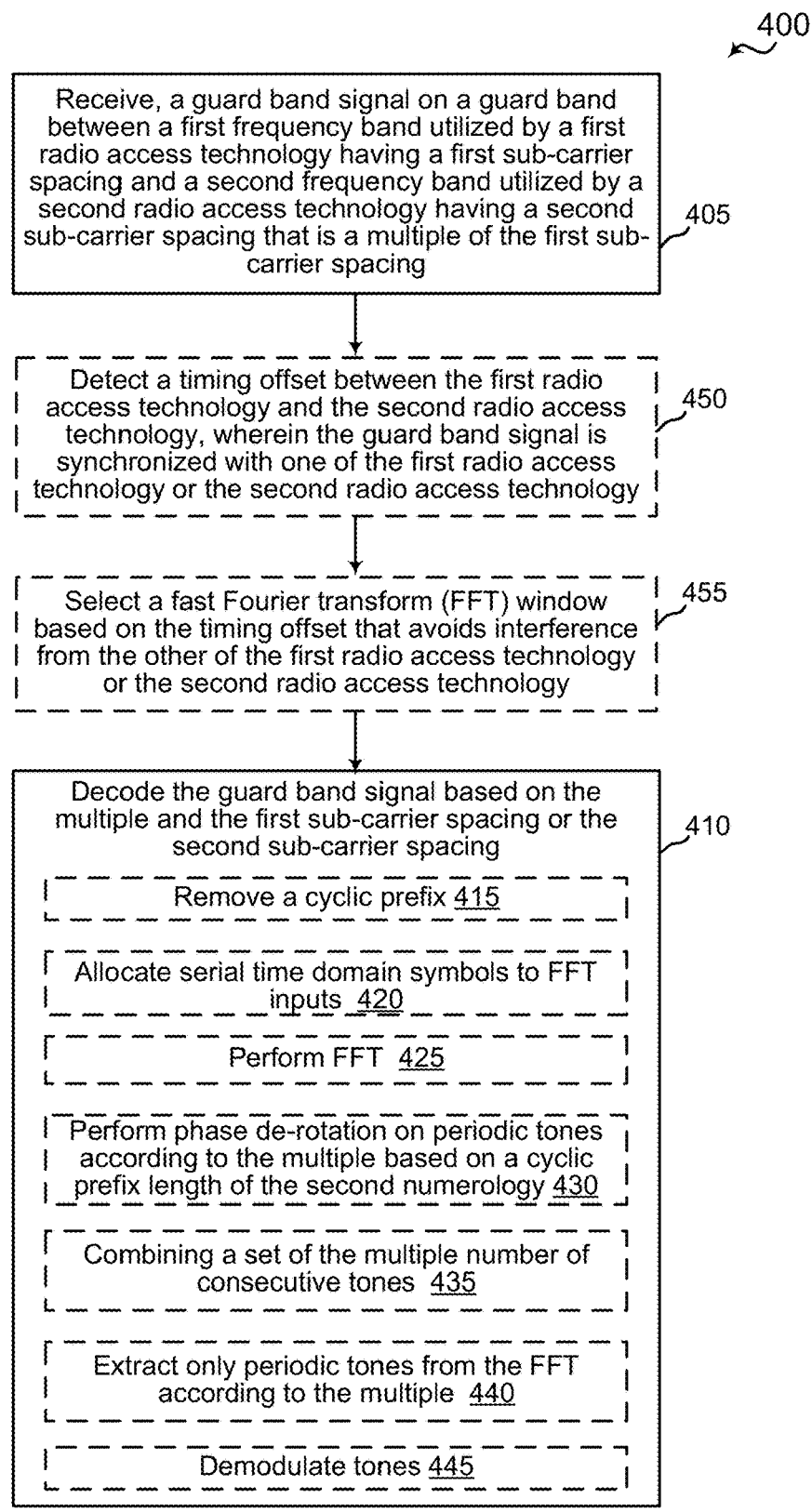
FIG. 4 is a flow chart illustrating an example method for receiving unified synchronization signals, in accordance with various aspects of the present disclosure.

Turning now to FIGS. 3 and 4, aspects are depicted with reference to one or more components and one or more methods that may perform the actions or operations described herein, where aspects in dashed line may be optional. Although the operations described below in FIGS. 3 and 4 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 3, a flow chart illustrating an example method 300 for transmitting a guard band signal from a device such as the base stations 105 described in this disclosure.

At block 305, the method 300 may include generating, a guard band signal for transmission on a guard band. The guard band may be a frequency band between a first frequency band utilized by a first RAT having a first sub-carrier spacing and a second frequency band utilized by a second RAT having a second sub-carrier spacing that is a multiple of the first sub-carrier spacing. In an aspect, the guard band signal generator 242 may generate the guard band signal.

In an aspect, block 305 may optionally include, at block 310, generating modulation symbols based on data to transmit. Generating modulation symbols may be based on any modulation technique known in the art.

In an aspect, block 305 may optionally include, at block 315, performing phase rotation on periodic modulation symbols according to the multiple based on a cyclic prefix length of a second numerology corresponding to the second sub-carrier spacing. For example, if the multiple is 2, every other modulation symbol (e.g., even symbols) may be phase rotated based on a cyclic prefix length of the second numerology.

In an aspect, block 305 may optionally include, at block 320, performing an inverse fast Fourier transform (IFFT) on the modulation symbols. In an aspect, block 305 may optionally include, at block 325, serializing time domain symbols from the IFFT.

In an aspect, block 305 may optionally include, at block 330, performing a cyclic shift on periodic time domain symbols according to the multiple based on a cyclic prefix length of the second numerology. For example, if the multiple is 2, a cyclic shift may be performed on every other symbol to move a first portion of the symbol having a cyclic prefix length to the end of the symbol. This cyclic shift may effectively add a cyclic postfix to the symbol.

In an aspect, block 305 may optionally include, at block 335, allocating modulation symbols to periodic inputs of the IFFT according to the multiple. For example, if the multiple is 2, modulation symbols may be allocated to every other input tone of the IFFT.

In an aspect, block 305 may optionally include, at block 340 adding a cyclic prefix. The cyclic prefix may be based on a cyclic prefix length according to either the first numerology or the second numerology depending on which numerology will be used to decode the guard band signal. Further, in an aspect, the cyclic prefix may be used to adjust for time differences between the first RAT and the second RAT. For example, the cyclic prefix length may be reduced to align the guard band symbols with the first RAT or the second RAT.

In an aspect, block 305 may optionally include, at block 345, detecting a timing offset between the first radio access technology and the second radio access technology. In an aspect, for example, Tx timing component 246 may detect a timing offset between the first radio access technology and the second radio access technology. For example, the Tx timing component 246 may compare transmit configurations and/or received synchronization signals for the first radio access technology and the second radio access technology.

In an aspect, block 305 may optionally include, at block 350, Synchronize the synchronizing the guard band signal with one of the first radio access technology or the second radio access technology. In an aspect, for example, the Tx timing component 246 may synchronize the guard band signal with one of the first radio access technology or the second radio access technology. For example, the Tx timing component 246 may configure Tx Radio 275 to begin transmitting a guard band signal at the same time as a signal for the first radio access technology or the second radio access technology is being transmitted.

In block 355, the method 300 may include transmitting the guard band signal on the guard band. In an aspect, for example, the guard band signal generator 242 may provide the guard band signal to the transceiver 270 for transmission on the guard band via the RF front end 290 and the antenna 273.

Referring to FIG. 4, a flow chart illustrating an example method 400 for transmitting a guard band signal from a device such as the base stations 105 described in this disclosure.

At block 405, the method 400 may include receiving, a guard band signal for on a guard band. The guard band may be a frequency band between a first frequency band utilized by a first RAT having a first sub-carrier spacing and a second frequency band utilized by a second RAT having a second sub-carrier spacing that is a multiple of the first sub-carrier spacing. In an aspect, the guard band signal component 240 may receive the guard band signal from the transceiver 270.

At block 410, the method 400 may include decoding the guard band signal based on the multiple and the first sub-carrier spacing or the second sub-carrier spacing. In an aspect, the guard band signal decoder 250 may decode the guard band signal based on the multiple and the first sub-carrier spacing or the second sub-carrier spacing.

At block 450, the method 400 may optionally include detecting a timing offset between the first radio access technology and the second radio access technology, wherein the guard band signal is synchronized with one of the first radio access technology or the second radio access technology. In an aspect, for example, the Rx timing component 252 may detect a timing offset between the first radio access technology and the second radio access technology. The Rx timing component 252 may further detect that the guard band signal is synchronized with one of the first radio access technology or the second radio access technology. For example, the Rx timing component 252 may compare channel configuration information and/or synchronization signals to detect the timing offset.

At block 455, the method 400 may optionally select a FFT window based on the timing offset that avoids interference from the other of the first radio access technology or the second radio access technology. In an aspect, for example, the Rx timing component 252 may select a FFT window based on the timing offset that avoids interference from the other of the first radio access technology or the second radio access technology. The Rx timing component 252 may select the FFT window based on the timing offset that includes a portion of a symbol and a portion of a cyclic prefix of the other of the first radio access technology or the second radio access technology.

In an aspect, block 410 may optionally include, at block 415, removing a cyclic prefix. Removing the cyclic prefix may be based on a cyclic prefix length according to either the first numerology or the second numerology. Further, removing the cyclic prefix may include utilizing the cyclic prefix to adjust for timing differences between the first radio access technology and the second radio access technology. For example, the cyclic prefix may be used to replace an end portion of the symbol that was cut off to adjust for the timing differences.

In an aspect, block 410 may optionally include, at block 420, allocating serial time domain symbols to FFT inputs. In an aspect, block 410 may optionally include, at block 425, performing a fast Fourier transform (FFT) on the time domain symbols.

In an aspect, block 410 may optionally include, at block 430, performing a phase de-rotation on periodic tones according to the multiple based on a cyclic prefix length of the second numerology. For example, if the multiple is 2, every other tone may be de-rotated based on the cyclic prefix length of the second numerology.

In an aspect, block 410 may optionally include, at block 435, combining a set of the multiple number of consecutive tones. For example, if the multiple is 2, a de-rotated tone may be combined with a consecutive tone that was not de-rotated. The consecutive tones may be repetitions. Accordingly, the repetitions may provide redundancy that improves the likelihood of correctly decoding the signal. In an aspect, maximum ratio combining may be used to combine the tones.

In an aspect, block 410 may optionally include, at block 440, extracting only periodic tones from the FFT according to the multiple. For example, if the multiple is 2, only every other tone may be extracted from the FFT. In an aspect, only the tones that do not require de-rotation may be extracted.

In an aspect, block 410 may optionally include, at block 445, demodulating the tones. The demodulating may be performed according to the modulation technique used to modulate the data. Demodulating the tones may produce the original data that was transmitted.

Figure 5:
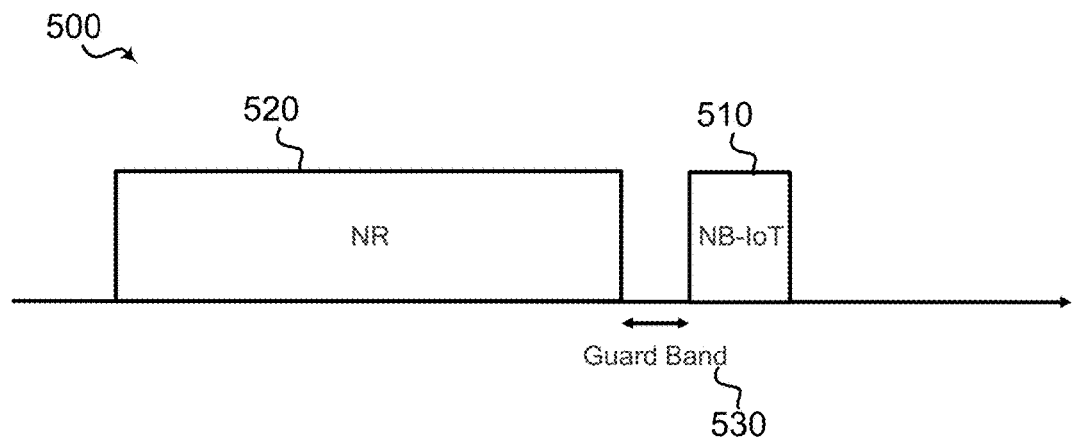
FIG. 5 is a diagram illustrating an example of neighboring frequency bands, in accordance with various aspects of the present disclosure.

FIG. 5 is a diagram 500 illustrating an example of neighboring frequency bands 510, 520. In an aspect, a first frequency band 510 may be utilized by a first RAT and a second frequency band 520 may be utilized by a second RAT. In the illustrated example, the first frequency band 510 may be utilized by a NB-IoT service while the second frequency band 520 may be utilized by a 5G NR service. It should be appreciated that other services or RATs may utilize neighboring frequency bands. The first frequency band 510 may be separated from the second frequency band 520 by a guard band 530. Typically, the guard band 530 does not include transmissions. Accordingly, the guard band 530 typically prevents inter carrier interference by reducing energy leaking into a neighboring frequency band. According to aspects of the present disclosure, the guard band 530 may be utilized for transmission.

Figure 6:
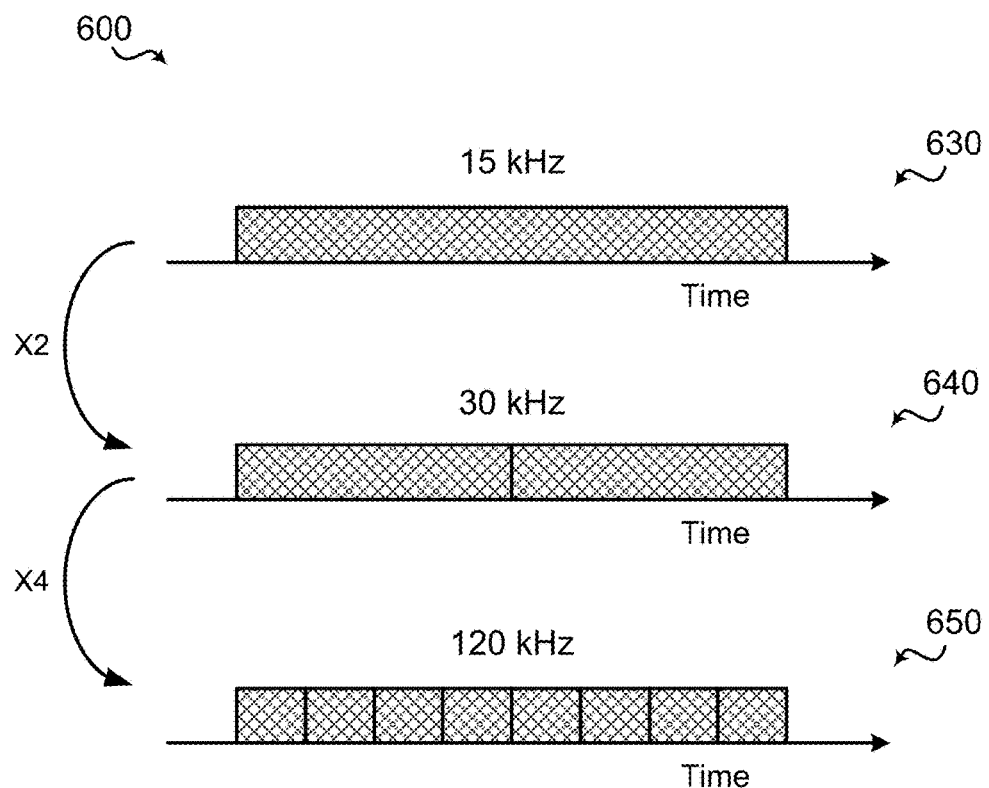
FIG. 6 illustrates and example of scalable subcarrier spacing, in accordance with various aspects of the present disclosure.

FIG. 6 illustrates an example of scalable subcarrier spacing 600. Diagram 630 illustrates a first subcarrier spacing of 15 kHz. In the time domain, the diagram 630 shows a waveform having a single copy or repetition of a symbol when a base or basic subcarrier spacing is used (e.g., 15 kHz). For example, the diagram 630 may correspond to a first sub-carrier spacing for a first frequency band 510. The base or basis subcarrier spacing may refer to the smallest subcarrier spacing utilized in neighboring frequency bands. Diagram 640 illustrates a waveform having two concatenated copies or repetitions of a symbol shown when a multiple (X2) of base or basic subcarrier spacing is used (e.g., 30 kHz). For example, the diagram 640 may correspond to a second subcarrier spacing for the second frequency band 520. Diagram 650 illustrates a waveform having eight concatenated copies or repetitions of a symbol shown when a multiple (X2×X4) of base or basic subcarrier spacing is used.

Figure 7:
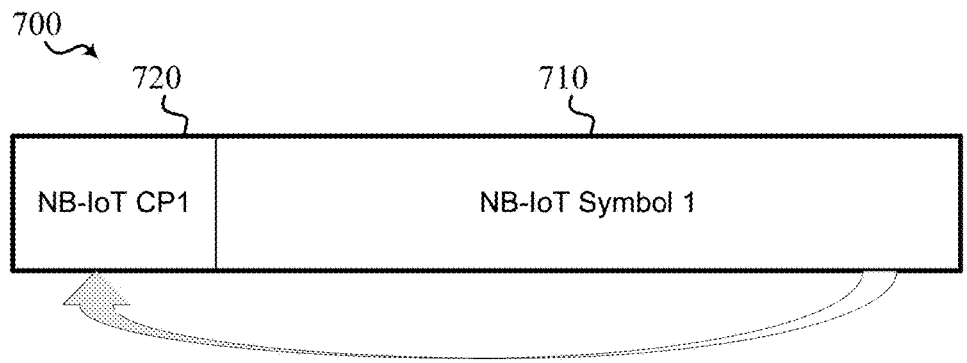
FIG. 7 illustrates an example of a narrow band internet of things (NB-IoT) signal, in accordance with various aspects of the present disclosure.

FIG. 7 illustrates an example of a narrow band internet of things (NB-IoT) signal 700. The NB-IoT signal 700 may be utilized in the first frequency band 510. In this example, the NB-IoT signal 700 may be considered to use the base sub-carrier spacing (e.g., 15 kHz). The NB-IoT signal 700 includes a single NB-IoT symbol 710 during a time period (e.g., a symbol period). A NB-IoT cyclic prefix 720 is added to the start of the NB-IoT symbol 710. The NB-IoT cyclic prefix 720 is copied from an end portion of the NB-IoT symbol 710.

Figure 8:
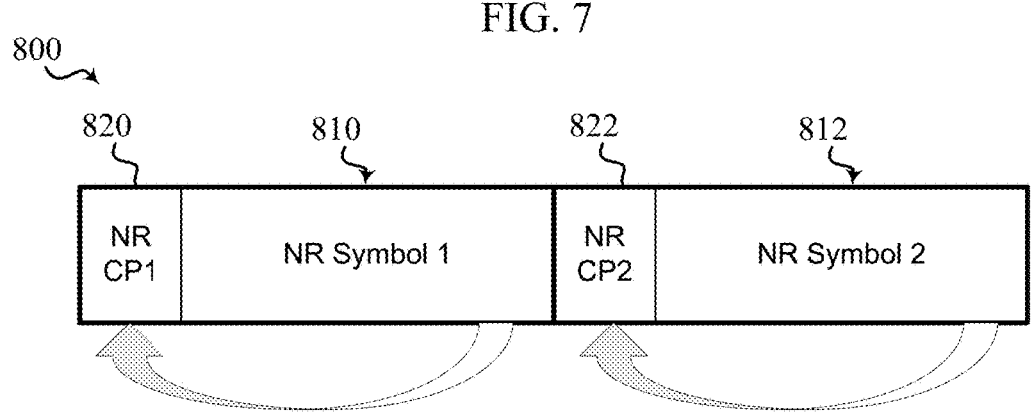
FIG. 8 illustrates an example of a 5G new radio signal in accordance with various aspects of the present disclosure.

FIG. 8 illustrates an example of a 5G NR signal 800. The NR signal 800 may be utilized in the second frequency band 520. In this example, the NR signal 800 may be considered to use a multiple (e.g., 30 kHz) of the base sub-carrier spacing (e.g., 15 kHz). Accordingly, the sub-carrier spacing for the NR signal 800 is two times the sub-carrier spacing for the NB-IoT signal 700. The NR signal 800 includes a two NR symbols 810, 812 during the time period (e.g., the symbol period for the NB-IoT symbol). A NR cyclic prefix 820, 822 is added to the start of each of the NR symbols 810, 812. Each NR cyclic prefix 820, 822 is copied from an end portion of the respective NR symbol 810, 812.

Figure 9:
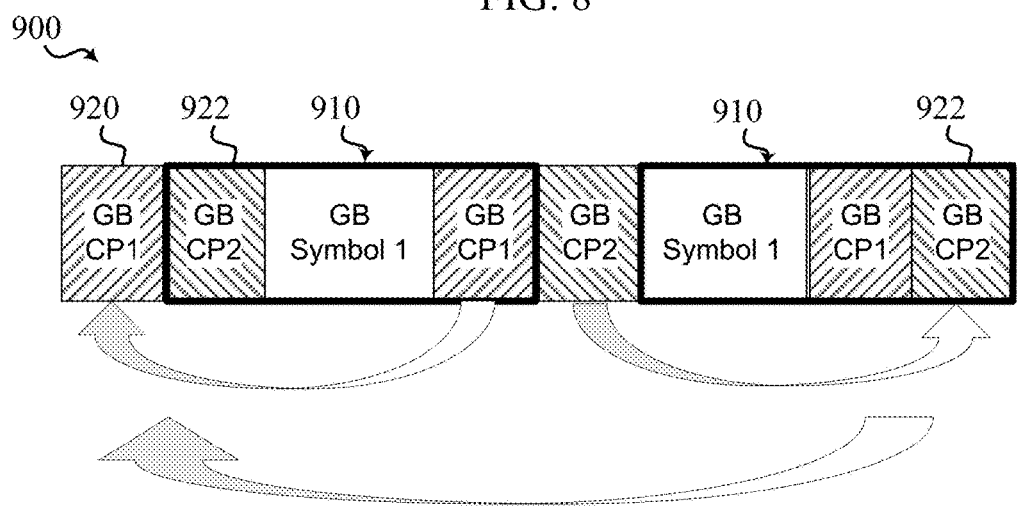
FIG. 9 illustrates an example of a guard band signal, in accordance with various aspects of the present disclosure.

FIG. 9 illustrates an example of a guard band signal 900. The guard band signal 900 has the same sub-carrier spacing and symbol length as the NR signal 800. Accordingly the sub-carrier spacing for the guard band signal 900 is also a multiple (e.g., 2) of the sub-carrier spacing of the NB-IoT signal 700. As illustrated, the guard band signal 900 includes two symbols within a symbol period of the NB-IoT signal 700. Each symbol may be a cyclic prefixed orthogonal frequency division multiplex (CP-OFDM) symbol including a IFFT symbol portion and a cyclic prefix portion 920. Instead of transmitting different symbols in consecutive symbol periods as in the NR signal 800, the guard band signal 900 may include a repeated IFFT symbol referred to as the guard band (GB) symbol 910. That is, in the second symbol period, the same symbol is transmitted. In an aspect, the guard band symbol 910 is cyclically shifted in the subsequent symbol by the length of the cyclic prefix. The cyclic prefix portion for each guard band symbol 910, is based on the end portion of the cyclically shifted symbol. In the first symbol period, a first cyclic prefix portion 920 is copied from the end of the guard band symbol 910. In the second symbol period, a cyclic postfix portion 922 is copied from the beginning of the guard band symbol 910 and concatenated to the end of the guard band symbol 910. Accordingly, the guard band signal 900 matches the structure for both NB-IoT and NR. Alternatively, the cyclic prefix portion 922 is obtained by cyclically shifting the guard band symbol 910, then taking a cyclic prefix from the shifted symbol.

On one hand, if interpreted as an NB-IoT signal including a single signal during the symbol period, a cyclic prefix including the first cyclic prefix portion 920 and the cyclic postfix portion 922 is located at the beginning of symbol and corresponds to the end of the symbol period. Accordingly, at least in terms of numerology, the structure of the guard band signal 900 matches the structure of signal 700. Therefore, the guard band signal 900 may be orthogonal to the signal 700 and may minimize inter carrier interference. On the other hand, if interpreted as an NR signal having a symbol period of half the NB-IoT symbol period, the first cyclic prefix portion 920 matches the end of the first guard band symbol 910 and the cyclic postfix portion 922, which is copied from the start of the second GB symbol 910, matches the start of the second GB symbol 910. Accordingly, the start of the second GB symbol 910 can be interpreted as a cyclic prefix based on the cyclic postfix portion 922. Therefore, in terms of numerology, the guard band signal 900 also matches the structure of NR signal 800. Thus, the guard band signal 900 may be orthogonal to the NR signal 800 and may minimize inter carrier interference.

Figure 10:
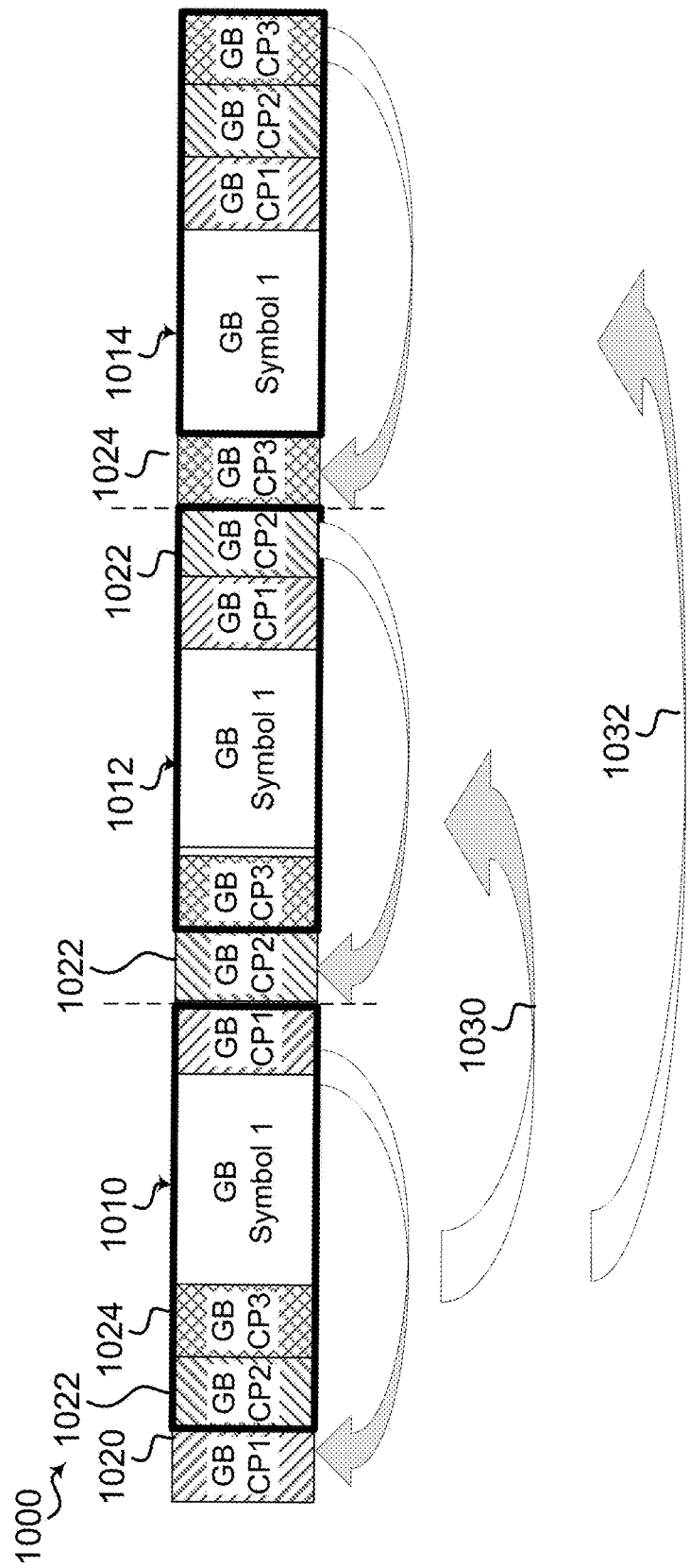
FIG. 10 illustrates another example of a guard band signal, in accordance with various aspects of the present disclosure.

FIG. 10 illustrates an example of a guard band signal 1000, where the sub-carrier spacing of a second numerology is a multiple of 3 of the sub-carrier spacing of the first numerology. Accordingly, the symbol period under the second numerology is ⅓ the symbol period of the first numerology. When interpreted under the second numerology, the guard band signal 1000 has three symbols, each including an IFFT symbol portion referred to as a guard band symbol 1010, 1012, 1014 and a respective cyclic prefix portion 1020, 1022, 1024. Accordingly, each symbol is a CP-OFDM symbol according to the second numerology. In the first symbol, the cyclic prefix portion 1020 is based on the end portion of the first symbol. In the second symbol, the guard band symbol 1010 is cyclically shifted. The cyclic shift 1030 is equal to the cyclic prefix length. The cyclic prefix portion 1022 is based on the end portion of the cyclically shifted second guard band symbol 1010. In the third symbol, the guard band symbol 1014 is cyclically shifted 1032 by twice the cyclic prefix length (or the second guard band symbol 1012 is cyclically shifted by the cyclic prefix length). Accordingly, the second guard band symbol 1012 is a cyclic shifted copy of the IFFT symbol portion of the preceding symbol 1012 and the cyclic shift is equal to the cyclic prefix length in the second numerology. Similarly the third guard band signal 1014 is a cyclic shifted copy of the IFFT symbol portion of the preceding symbol 1014 and the cyclic shift is equal to the cyclic prefix length in the second numerology.

FIG. 11 illustrates an example of transmission processing 1100 for a guard band signal. For example, the guard band signal generator 242 may perform the processing 1100 illustrated in FIG. 11 based on a symbol length and cyclic prefix length corresponding to a sub-carrier spacing that is a multiple of the sub-carrier spacing. For example, the processing in FIG. 11 may be performed based on NR symbol length and cyclic prefix length. Data 1110 may be provided to a modulator 1120. The modulator 1120 may modulate the data according to a modulation scheme (e. g, BPSK, QPSK, 16 QAM, 64 QAM) to generate modulation symbols. The processing 1100 may include a number of branches equal to the multiple of the sub0carrier spacing. In the case of a multiple of 2, the odd symbols are sent to a first branch 1130 and the even symbols are sent to a second branch 1140. In the case of a greater multiple (N), Every Nth symbol may be sent to the same branch. The first branch 1130 performs the inverse fast Fourier transform (IFFT) at block 1132 to convert the symbols to the time domain. The symbols are then serialized from the parallel branches of the IFFT at block 1134. A cyclic prefix is added to each symbol to generate the odd transmission symbols at block 1136. In the second branch 1140, at block 1142, the phase of the modulation symbols is first rotated according to the cyclic prefix length. The second branch then performs, at block 1144, the IFFT and then serializes the time domain symbols at block 1146. A cyclic prefix (based on the rotated symbol) is then added to each of the symbols to form the even transmission symbols at block 1148.

FIG. 12 illustrates another example of transmission processing 1200 for a guard band signal. The processing 1200 in FIG. 12 may be performed by the guard band signal generator 242 based on the symbol length and cyclic prefix length corresponding to a sub-carrier spacing that is a multiple of the sub-carrier spacing. The processing in FIG. 12 may be equivalent to the processing illustrated in FIG. 11. The processing in the first branch 1130 for the odd symbols may be the same as illustrated in FIG. 11. In the second branch 1150, the IFFT may be performed first at block 1144, followed by the serialization of the time domain symbols at block 1146. Instead of a phase rotation, a cyclic shift may be performed at block 1152 in the time domain to move the cyclic postfix portion 922 to the end of the symbol. The cyclic prefix may then be performed at block 1148 to copy the end portion to the beginning of the symbol.

FIG. 13 illustrates an example of receive processing 1300 for a guard band signal. In an aspect, the receive processing may be performed by the guard band signal decoder 250 based on a symbol length and cyclic prefix length corresponding to a sub-carrier spacing that is a multiple of the sub-carrier spacing. For a multiple of 2, the received symbols may be sent towards 2 branches 1310, 1320. If the multiple is greater than 2, a number of branches equal to the multiple may be used. In the first branch 1310, the cyclic prefix may be removed from each of the odd symbols at block 1312. The serial symbols may then be arranged in parallel at block 1314 and then fed to the FFT for conversion to the frequency domain at block 1316. Similarly, in the second branch 1320, the cyclic prefix is removed from each of the even symbols at block 1322. The serial symbols may be arranged in parallel in block 1324 and fed an FFT at block 1326. In the second branch 1320, the frequency domain symbols are then phase de-rotated based on the cyclic prefix length at block 1328. The odd symbols from the first branch and the even symbols from the second branch are then combined using maximum ratio combining at block 1330. The combined symbols are then demodulated at block 1340 to obtain the decoded data 1350.

FIG. 14 illustrates an example of alternative transmission processing 1400 for a guard band signal. In an aspect, the guard band signal generator 242 may perform the processing 1400 illustrated in FIG. 14 based on a symbol period corresponding to the base sub-carrier spacing of a first RAT (e.g., for NB-IoT) and the multiple N of the sub-carrier spacing for the second RAT. A modulator 1420 may modulate data to obtain modulation symbols. In the case of a multiple of 2, the modulation symbols may then be allocated only to even tones or sub-carriers at block 1430. In the case of a multiple of N, the modulation symbols may be allocated to every Nth tone. Accordingly, at block 1440, the IFFT may produce the repeated guard band symbols 910. The parallel symbols from the IFFT may be serialized at block 1450. A cyclic prefix having a length corresponding to the base sub-carrier spacing may then be added to each symbol at block 1460.

FIG. 15 illustrates an example of alternative receive processing 1500 for a guard band signal. In an aspect, the guard band signal decoder 250 may perform the processing 1500 illustrated in FIG. 15 based on a symbol period corresponding to the base sub-carrier spacing (for a first RAT, e.g., for NB-IoT) and a multiple of the sub-carrier spacing for the second RAT. The guard band signal decoder 250 may receive time domain symbols 1470 corresponding to the output of processing 1400. At block 1510, a cyclic prefix having a length based on the base sub-carrier spacing may be removed from the received time domain symbols 1470. At block 1520, the serial time domain symbols may be parallelized and fed to parallel inputs of the FFT 1530. The FFT 1530 may convert the time domain symbols into frequency domain tones. In the case of a multiple of 2, the guard band signal decoder 250 may extract only the even tones from the FFT at block 1540. In the case of a multiple of N, the guard band signal decoder 250 may extract every Nth tone from the FFT. At block 1550, the even tones may be demodulated to provide the decoded data 1410 that was originally input into the processing 1400.

Figure 16:
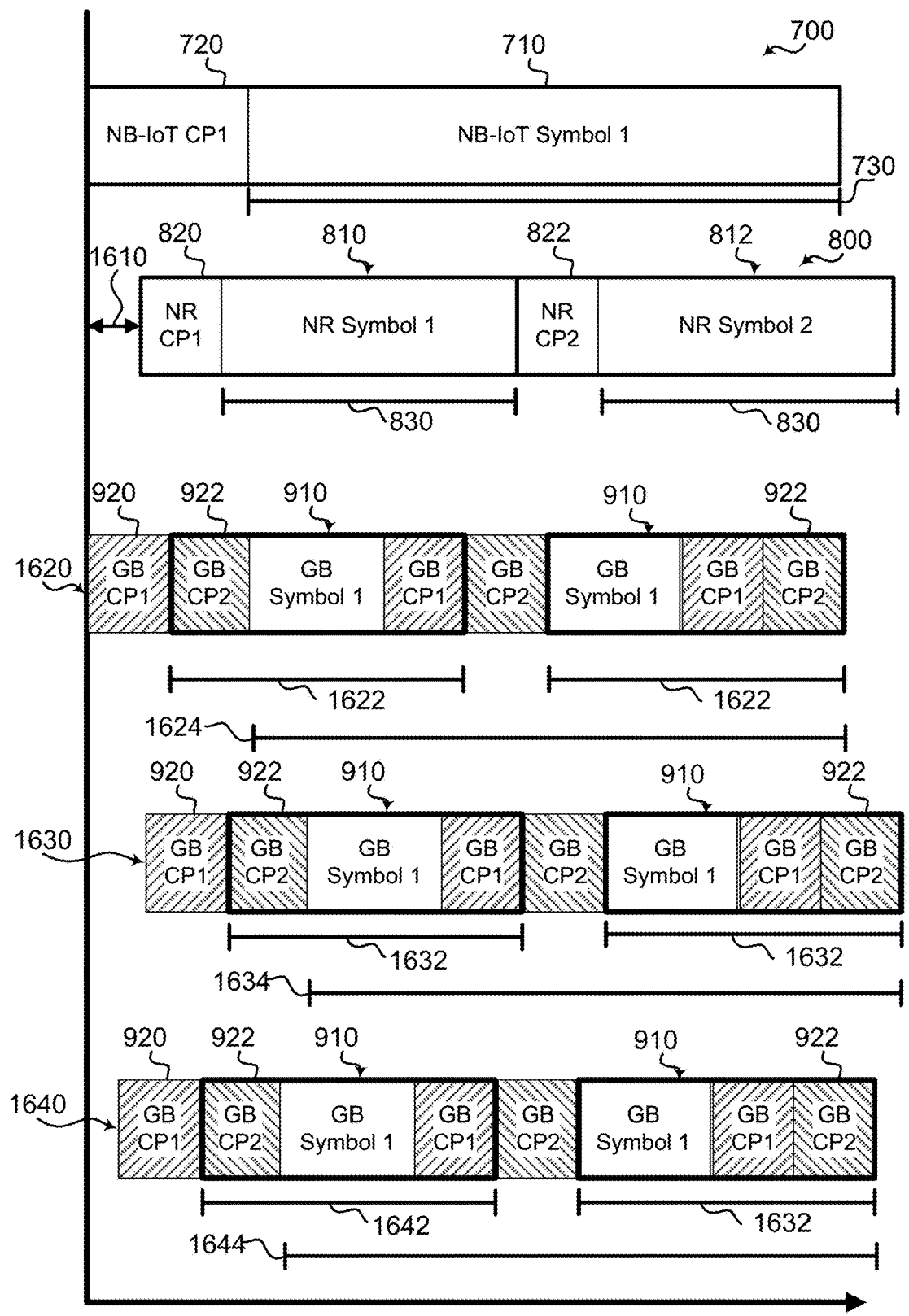
FIG. 16 illustrates examples of timing offsets among a first radio access technology, a second radio access technology, and a guard band signal.

FIG. 16 illustrates an example of timing offsets between a first RAT transmission, a second RAT transmission, and a guard band transmission. The first RAT transmission may be, for example, the NB-IoT signal 700. A receiving device may align a receive window 730 with the NB-IoT symbol 710. The second RAT transmission may be, for example, the NR signal 800. A receiving device may align a receive window 830 with each NR symbol 810. The first RAT transmission and the second RAT transmission may be offset in time by an offset 1610. For example, as illustrated, the symbols for the second RAT transmission may start the offset 1610 after the symbols for the first RAT transmission. The order may also be reversed. When the first RAT transmission and the second RAT transmission are offset (i.e., not time aligned), the guard band transmission may be aligned with either of the RAT transmissions, or configured with its own offset between the start of the first RAT transmission and the second RAT transmission.

In a first example, a guard band transmission 1620 may be aligned with the NB-IoT signal 700. The receiving device may align a receive window 1622 with the NB-IoT signal 700. For example, due to the alignment, of the guard band transmission 1620 with the NB-IoT signal 700, the GB receive window 1622 may start one CP length (e.g., the length of CP 920) after the start of the NB-IoT signal 700. If the receive window 1622 is used to receive the NR signal 800, the receive window will include a portion of the NR CP1 820 and a beginning of the NR symbol 810 such that the receiving device should be able to decode the NR symbol 810 using the NR CP1 820.

In a second example, a guard band transmission 1630 may be aligned with the NR signal 800. The receiving device may align a receive window 1632 with the NR signal 800. For example, due to the alignment, of the guard band transmission 1630 with the NR signal 800, the GB receive window 1632 may start one CP length (e.g., the length of CP 920) after the start of the NR signal 800. The receive window 1632 may be aligned with the receive window 830. If a receive window 1634 for the NB-IoT signal 700 is based on the GB receive window 1632, the receive window may include a portion of the NB-IoT CP1 720 and the NB-IoT symbol 710. Accordingly, the NB-IoT signal 700 may be decodable.

In a third example, the guard band transmission 1640 may be aligned between the first RAT transmission and the second RAT transmission. The receiving device may align a receive window 1642 with the GB symbols 910 based on the timing of the guard band transmission 1640. The receive window 1642 may not be aligned with either the receive window 730 or the receive window 830. The receive window 1642 may, however, overlap a portion of the NR symbol 810 and the NR CP 820 so that the NR signal 800 is decodable. Similarly, a receive window 1644 for NB-IoT based on the timing of the guard band transmission 1640 may also overlap the NB-IoT symbol 710 and the NB-IoT CP 720 such that the NB-IoT signal 700 is decodable. In this case, although use of the CP may be used for both NB-IoT signal 700 and NR signal 800, the chances of the receive window extending beyond the desired symbols resulting in inter-symbol interference may be reduced for the worst case scenario (e.g., the RAT with which the guard band transmission is not aligned).

Figure 17:
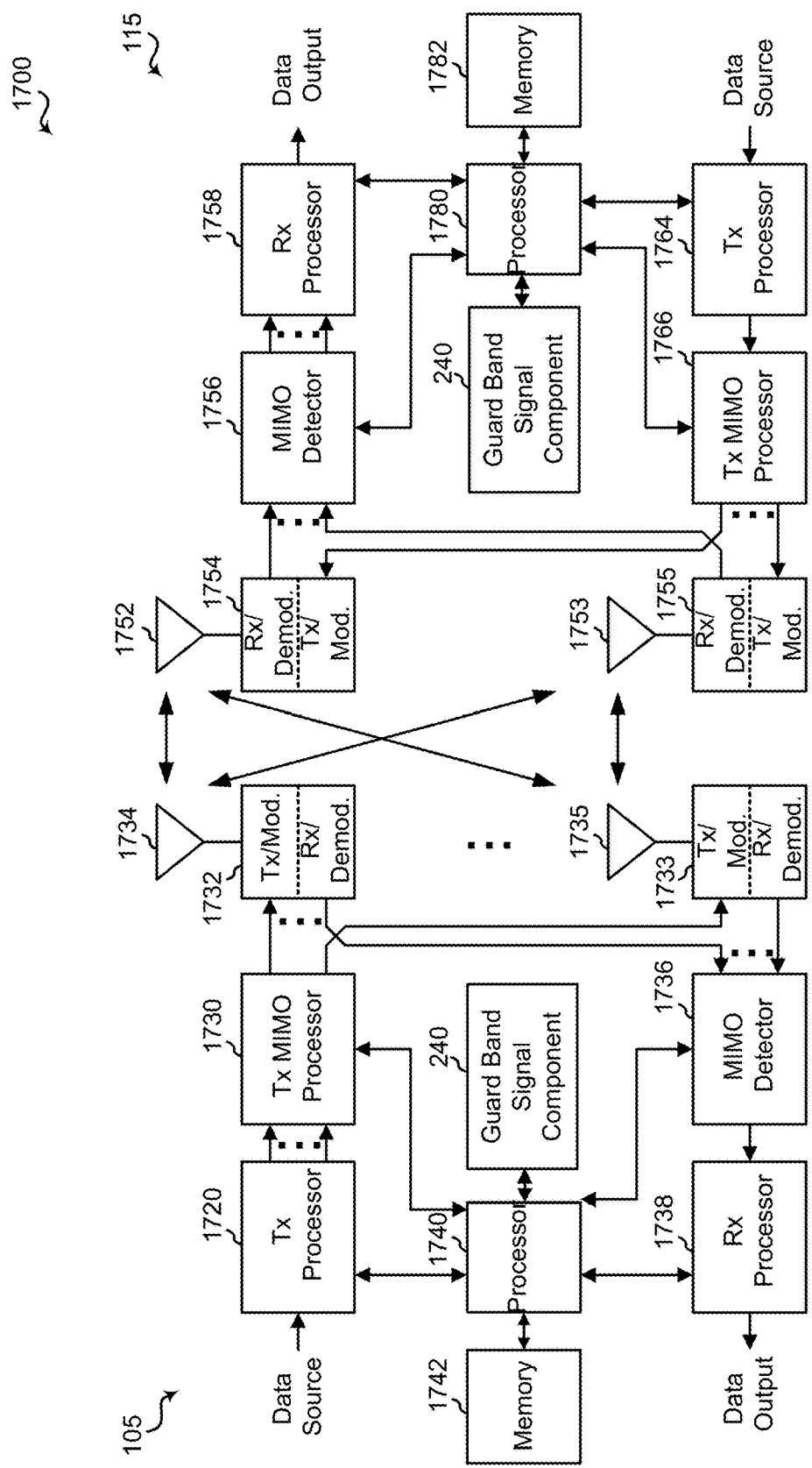
FIG. 17 is a block diagram illustrating an example of a MIMO communication system including a base station and a UE, in accordance with various aspects of the present disclosure.

FIG. 17 is a block diagram of a MIMO communication system 1700 including a base station 105 and a UE 115. The MIMO communication system 1700 may illustrate aspects of the wireless communication system 100 and diagram 200 described with reference to FIGS. 1 and 2. The base station 105 may be an example of aspects of the base station 105 described with reference to FIGS. 1, 2, and 3. The base station 105 may be equipped with antennas 1734 and 1735, and the UE 115 may be equipped with antennas 1752 and 1753. In the MIMO communication system 1700, the base station 105 may be able to send data over multiple communication links at the same time. Each communication link may be called a "layer" and the "rank" of the communication link may indicate the number of layers used for communication. For example, in a 2×2 MIMO communication system where base station 105 transmits two "layers," the rank of the communication link between the base station 105 and the UE 115 is two.

At the base station 105, a transmit (Tx) processor 1720 may receive data from a data source. The transmit processor 1720 may process the data. The transmit processor 1720 may also generate control symbols or reference symbols. A transmit MIMO processor 1730 may perform spatial processing (e.g., precoding) on data symbols, control symbols, or reference symbols, if applicable, and may provide output symbol streams to the transmit modulator/demodulators 1732 and 1733. Each modulator/demodulator 1732 through 1733 may process a respective output symbol stream (e.g., for OFDM, etc.) to obtain an output sample stream. Each modulator/demodulator 1732 through 1733 may further process (e.g., convert to analog, amplify, filter, and upconvert) the output sample stream to obtain a DL signal. In one example, DL signals from modulator/demodulators 1732 and 1733 may be transmitted via the antennas 1734 and 1735, respectively.

The UE 115 may be an example of aspects of the UEs 115 described with reference to FIGS. 1, 2, and 4. At the UE 115, the UE antennas 1752 and 1753 may receive the DL signals from the base station 105 and may provide the received signals to the modulator/demodulators 1754 and 1755, respectively. Each modulator/demodulator 1754 through 1755 may condition (e.g., filter, amplify, downconvert, and digitize) a respective received signal to obtain input samples. Each modulator/demodulator 1754 through 1755 may further process the input samples (e.g., for OFDM, etc.) to obtain received symbols. A MIMO detector 1756 may obtain received symbols from the modulator/demodulators 1754 and 1755, perform MIMO detection on the received symbols, if applicable, and provide detected symbols. A receive (Rx) processor 1758 may process (e.g., demodulate, deinterleave, and decode) the detected symbols, providing decoded data for the UE 115 to a data output, and provide decoded control information to a processor 1780, or memory 1782.

The processor 1780 may in some cases execute stored instructions to instantiate a guard band signal component 240 (see e.g., FIGS. 1 and 2).

On the uplink (UL), at the UE 115, a transmit processor 1764 may receive and process data from a data source. The transmit processor 1764 may also generate reference symbols for a reference signal. The symbols from the transmit processor 1764 may be precoded by a transmit MIMO processor 1766 if applicable, further processed by the modulator/demodulators 1754 and 1755 (e.g., for SC-FDMA, etc.), and be transmitted to the base station 105 in accordance with the communication parameters received from the base station 105. At the base station 105, the UL signals from the UE 115 may be received by the antennas 1734 and 1735, processed by the modulator/demodulators 1732 and 1733, detected by a MIMO detector 1736 if applicable, and further processed by a receive processor 1738. The receive processor 1738 may provide decoded data to a data output and to the processor 1740 or memory 1742.

The processor 1740 may in some cases execute stored instructions to instantiate a guard band signal component 240 (see e.g., FIGS. 1 and 2).

The components of the UE 115 may, individually or collectively, be implemented with one or more ASICs adapted to perform some or all of the applicable functions in hardware. Each of the noted modules may be a means for performing one or more functions related to operation of the MIMO communication system 1700. Similarly, the components of the base station 105 may, individually or collectively, be implemented with one or more ASICs adapted to perform some or all of the applicable functions in hardware. Each of the noted components may be a means for performing one or more functions related to operation of the MIMO communication system 1700.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of transmission in wireless communications, comprising:
   generating, a guard band signal for transmission on a guard band between a first frequency band utilized by a first radio access technology having a first sub-carrier spacing and a second frequency band utilized by a second radio access technology having a second sub-carrier spacing that is a multiple of the first sub-carrier spacing, wherein the guard band signal includes a symbol that is repeated a number of times equal to the multiple; and
   transmitting the guard band signal on the guard band.

2. The method of claim 1, wherein the guard band signal is interpretable according to a first numerology of the first radio access technology and according to a second numerology of the second radio access technology.

3. The method of claim 2, wherein the generating includes performing phase rotation on periodic modulation symbols according to the multiple based on a cyclic prefix length of the second numerology.

4. The method of claim 2, wherein the generating includes performing a cyclic shift on periodic time domain symbols according to the multiple based on a cyclic prefix length of the second numerology.

5. The method of claim 1, wherein the generating includes allocating modulation symbols to periodic inputs of an inverse fast Fourier transform (IFFT) according to the multiple.

6. The method of claim 2, wherein the guard band signal, when interpreted according to the second numerology, includes at least a first symbol and a second symbol that are each a cyclic prefix orthogonal frequency division multiplex (CP-OFDM) symbol in the second numerology including a cyclic prefix portion and an inverse fast Fourier transform (IFFT) symbol portion, wherein the IFFT symbol portion of the second symbol is a cyclic shifted copy of the IFFT symbol portion of the first symbol.

7. The method of claim 6, wherein the cyclic shift is equal to a length of the cyclic prefix in the second numerology.

8. The method of claim 6, wherein the guard band signal, when interpreted according to the first numerology, includes a symbol having a second cyclic prefix including the respective cyclic prefix portions of the symbols in the second numerology.

9. The method of claim 6, wherein the guard band signal, when interpreted according to the second numerology, further includes a third symbol that is a CP-OFDM symbol in the second numerology, wherein an IFFT symbol portion is a cyclic shifted copy of the IFFT symbol portion of the second symbol and the cyclic shift is equal to a length of the cyclic prefix in the second numerology.

10. The method of claim 2, wherein the guard band signal, when interpreted according to the second numerology, includes a plurality of symbols that are each a cyclic prefix orthogonal frequency division multiplex (CP-OFDM) symbol in the second numerology including a cyclic prefix portion and an inverse fast Fourier transform (IFFT) symbol portion, wherein the IFFT symbol portion of each symbol after a first symbol is a cyclic shifted copy of the IFFT symbol portion of the preceding symbol and the cyclic shift is equal to a length of the cyclic prefix portion in the second numerology.

11. The method of claim 1, wherein the generating comprises:
    detecting a timing offset between the first radio access technology and the second radio access technology; and
    synchronizing the guard band signal with one of the first radio access technology or the second radio access technology.

12. A method of receiving a guard band signal in wireless communications, comprising:
    receiving, a guard band signal on a guard band between a first frequency band utilized by a first radio access technology having a first sub-carrier spacing and a second frequency band utilized by a second radio access technology having a second sub-carrier spacing that is a multiple of the first sub-carrier spacing, wherein the guard band signal includes a symbol that is repeated a number of times equal to the multiple; and
    decoding the guard band signal based on the multiple and the first sub-carrier spacing or the second sub-carrier spacing.

13. The method of claim 12, wherein the guard band signal is interpretable according to a first numerology of the first radio access technology and according to a second numerology of the second radio access technology.

14. The method of claim 13, wherein the decoding includes performing phase de-rotation on periodic tones according to the multiple based on a cyclic prefix length of the second numerology.

15. The method of claim 14, wherein the decoding includes combining a set of the multiple number of consecutive symbols.

16. The method of claim 14, wherein the decoding includes extracting only periodic tones from a fast Fourier transform (FFT) according to the multiple.

17. The method of claim 12, further comprising:
detecting a timing offset between the first radio access technology and the second radio access technology, wherein the guard band signal is synchronized with one of the first radio access technology or the second radio access technology; and
selecting a fast Fourier transform (FFT) window based on the timing offset that avoids interference from the other of the first radio access technology or the second radio access technology.

18. The method of claim 17, wherein selecting the FFT window comprises selecting the FFT window based on the timing offset that includes a portion of a symbol and a portion of a cyclic prefix of the other of the first radio access technology or the second radio access technology.

19. An apparatus for transmission on a guard band in wireless communications, comprising:
a transmitter;
a memory configured to store instructions; and
a processor coupled to the transmitter and the memory, the processor being configured to execute the instructions to:
generate, a guard band signal for transmission on a guard band between a first frequency band utilized by a first radio access technology having a first sub-carrier spacing and a second frequency band utilized by a second radio access technology having a second sub-carrier spacing that is a multiple of the first sub-carrier spacing, wherein the guard band signal includes a symbol that is repeated a number of times equal to the multiple; and
transmit the guard band signal on the guard band.

20. The apparatus of claim 19, wherein the guard band signal is interpretable according to a first numerology of the first radio access technology and according to a second numerology of the second radio access technology.

21. The apparatus of claim 20, wherein the processor is configured to execute the instructions to perform phase rotation on periodic modulation symbols according to the multiple based on a cyclic prefix length of the second numerology.

22. The apparatus of claim 20, wherein the processor is configured to execute the instructions to perform a cyclic shift on periodic time domain symbols according to the multiple based on a cyclic prefix length of the second numerology.

23. The apparatus of claim 20, wherein the processor is configured to execute the instructions to allocate modulation symbols to periodic inputs of an inverse fast Fourier transform (IFFT) according to the multiple.

24. The apparatus of claim 19, wherein the wherein the processor is configured to execute the instructions to:
detect a timing offset between the first radio access technology and the second radio access technology; and
synchronize the guard band signal with one of the first radio access technology or the second radio access technology.

25. An apparatus for transmission on a guard band in wireless communications, comprising:
a receiver;
a memory configured to store instructions; and
a processor coupled to the transmitter and the memory, the processor being configured to execute the instructions to:
receive, via the receiver, a guard band signal on a guard band between a first frequency band utilized by a first radio access technology having a first sub-carrier spacing and a second frequency band utilized by a second radio access technology having a second sub-carrier spacing that is a multiple of the first sub-carrier spacing, wherein the guard band signal includes a symbol that is repeated a number of times equal to the multiple; and
decode the guard band signal based on the multiple and the first sub-carrier spacing or the second sub-carrier spacing.

26. The apparatus of claim 25, wherein the guard band signal is interpretable according to a first numerology of the first radio access technology and according to a second numerology of the second radio access technology.

27. The apparatus of claim 26, wherein the processor is configured to execute the instructions to perform phase de-rotation on periodic tones according to the multiple based on a cyclic prefix length of the second numerology.

28. The apparatus of claim 27, wherein the processor is configured to execute the instructions to combine a set of the multiple number of consecutive symbols.

29. The apparatus of claim 27, wherein the processor is configured to execute the instructions to extract only periodic tones from a fast Fourier transform (FFT) according to the multiple.

30. The apparatus of claim 26, wherein the processor is configured to execute the instructions to:
detect a timing offset between the first radio access technology and the second radio access technology, wherein the guard band signal is synchronized with one of the first radio access technology or the second radio access technology; and
select a fast Fourier transform (FFT) window based on the timing offset that avoids interference from the other of the first radio access technology or the second radio access technology.

* * * * *